Jan. 17, 1967 R. B. COSTELLO ET AL 3,298,222

DEVICE FOR MEASURING SURFACE CHARACTERISTICS

Filed Dec. 20, 1963

INVENTORS
Robert B. Costello, &
Robert M. Robertson
BY Hugh L. Fisher
ATTORNEY

United States Patent Office
3,298,222
Patented Jan. 17, 1967

3,298,222
DEVICE FOR MEASURING SURFACE CHARACTERISTICS

Robert B. Costello, Santa Barbara, and Robert Malcolm Robertson, Goleta, Calif., assignors to General Motors Corporation, Detroit, Mich., a corporation of Delaware
Filed Dec. 20, 1963, Ser. No. 332,051
3 Claims. (Cl. 73—84)

This invention relates to apparatus for measuring the load bearing characteristics of a remote and relatively inaccessible surface and, more particularly, to a compact and inexpensive device which indicates such characteristics upon being projected against the surface to be investigated.

It is often desirable or necessary to obtain an indication of the rigidity, compaction, or load bearing characteristics of a surface prior to the initiation of operations on that surface. Where the surface is readily accessible, a number of methods which vary widely in sophistication may be used. For example, if it is desired to obtain an indication of the load bearing characteristics of soil, a person with a fair amount of experience may obtain a rough and ready indication by digging the heel of his shoe into the soil. A somewhat more sophisticated method involves the use of a static device which indicates the pressure required to force an element of a predetermined shape into the soil. This principle is exploited in various types of hardness testing machines.

Where the load bearing characteristics of a relatively remote and inaccessible surface are required, such as the ocean floor, additional problems arise. In such a situation, it may be impracticable for one to place himself in a position which makes possible direct contact with the surface, the characteristics of which are sought. Instead, a measuring device may be gravitationally projected against the surface to provide a degree of information relating to the rigidity or load bearing characteristics of the surface. The prior art suggests one device for accomplishing this purpose including a finned body to maintain a proper orientation while traveling through the water and a spring biased plunger extending from the forward end thereof. Upon contact of the plunger with the surface being measured, the plunger is driven into the body to an extent depending upon the severity of the impact and a displaceable pointer is maintained in a position indicative of the maximum displacement of the plunger relative to the body. To obtain the information collected by the device, it must be returned to the point from which it was dropped; for example, reeled back to the deck of a ship floating on the surface. At this point, the maximum reading is observed and is interpreted to indicate the softness, compaction or load bearing characteristics of the ocean floor. It can be seen that only a limited amount of information is made available by this instrument and it must be retrieved before such information is available.

It is the primary object of the present invention to provide a device for measuring the load bearing characteristics of a relatively remote and inaccessible surface by means of a device which is projected against the surface and which gives an immediate indication of the load bearing characteristics as indicated by the nature of the deceleration experienced by the device upon contact with the surface, the characteristics of which are being measured. In accordance with the invention, complete information relating to surface characteristics is afforded without the need of retrieving the device.

Briefly stated, the subject invention comprises a hydrodynamically designed vehicle which is adapted for gravitational projection against the surface to be investigated, and accelerometer means carried by the vehicle and effective to produce a signal quantity of a character which corresponds to the character of the acceleration experienced by the vehicle upon contact with the remote surface. The subject device further includes means for instantly transmitting the signal quantity which is produced by the vehicle-carried accelerometer means to a receiving station, such as a ship, where the signal quantity may be immediately analyzed or recorded for future analysis. In accordance with the invention, the signal quantity which is provided by the device corresponds to the time-displacement characteristics of a suspended mass carried by the vehicle. Accordingly, the information provides, in addition to a maximum acceleration reading, other information regarding the time required for complete negative acceleration and other information obtainable from an analysis of the slope and rate-of-change of slope of the time-displacement curve.

In a preferred embodiment, the invention is described in terms of a hydrodynamically stable device which is designed to rapidly attain a relatively low terminal velocity in a fluid medium, such as water, such that velocity upon impact is made relatively certain. In addition, the vehicle carries a transmission line which is paid out of the vehicle during descent in a manner which has a minimum effect on the velocity thereof.

It will be understood from the following description that the utility of the present invention is not confined to the measurement of load bearing characteristics of surfaces which are under water. Instead, the invention contemplates use wherever a substantially horizontal surface is to be investigated from a point above the surface such that the device may be projected against the surface with the aid of the force of gravity. Accordingly, the term "hydrodynamically designed" is to be interpreted in the broadest sense to include a design which facilitates stable and regular movement through water and other fluids, such as air.

The nature and operation of the present invention may be more readily understood with reference to the following specification which describes a specific embodiment of the invention. This specification is to be taken with the accompanying drawings of which:

Figure 1:
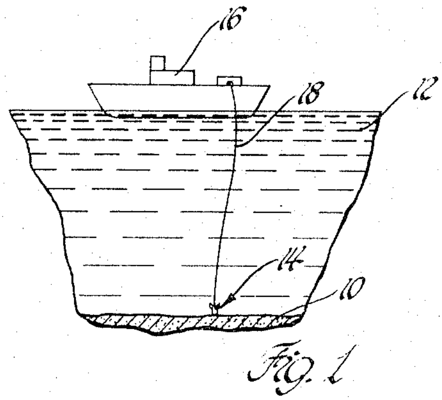
FIGURE 1 illustrates one environmental setting for the use of the invention.

The specific embodiment of the subject invention which is shown in the accompanying figures may be briefly described with reference to the setting shown in FIGURE 1. It is assumed that an indication of the load bearing capacity of the floor 10 of a body of water 12, such as a lake or an ocean, is desired. In accordance with the invention, this may be accomplished by projecting against the floor 10 a hydrodynamically designed vehicle indicated at 14. The vehicle 14 is projected against the floor 10 with the aid of the force of gravity which propels the vehicle 14 through the water 12 after being launched from a ship 16 which serves as an analysis station. As will become more apparent upon specific reference to FIGURES 2 and 3, the vehicle 14 is hydrodynamically designed to insure a stable and constant-velocity descent through the water 12. This may be readily accomplished by designing the vehicle to have a relatively low terminal velocity which may be speedily attained. Knowledge of the terminal velocity is, of course, necessary to make an accurate analysis of the information provided by the device. In the specific embodiment described herein the vehicle 14 carries an accelerometer. The accelerometer includes a mass which may be mounted for displacement but which is urged to a reference position by means of a spring which tends to resist displacement. Upon contact of the vehicle 14 with the floor 10, the vehicle decelerates according to the nature or characteristics of the floor 10. This deceleration or negative acceleration is reflected in the time-displacement characteristic of the suspended mass. Accordingly, means are operatively associated with the suspended mass to develop an electrical signal waveform which corresponds with the time-displacement characteristic of the mass. This waveform is communicated to the ship 16 by means of a transmission conductor 18 which is paid out of a compartment to the rear of the vehicle during the descent period.

Figure 2:
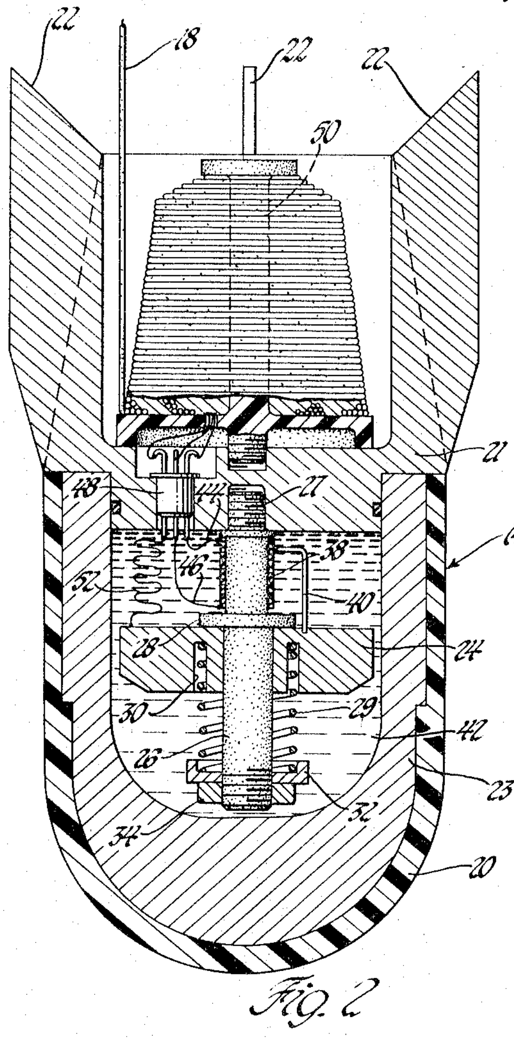
FIGURE 2 is a cross-sectional view of a specific embodiment of the invention illustrating the interior conditions at a time prior to the contact with the surface being measured.

Referring now to FIGURE 2, the vehicle 14 is shown to be substantially bomb-shaped having a smooth nose section 20, and a tail section 21 having formed thereon a set of stabilizing fins 22. Both the nose and tail sections 20 and 21 may be constructed of plastic. The interior of the vehicle 14 consists partially of a ballast material 23, such as lead, which may be trimmed in accordance with the desired descent characteristic. As shown, the ballast material 23 is hollowed out to accommodate an accelerometer and signal generating system including a mass 24 of conductive metal which is mounted on a cylindrical shaft 26 of insulative material running along the vertical axis of the vehicle 14. The shaft 26 is secured to the tail section 21 by means of a threaded portion shown at 27. The mass 24 is urged to a reference position defined by a stop 28 formed on the shaft 26 as indicated in FIGURE 2 by means of a resilient spring 29. The spring is adapted to fit into an annular slot 30 in the mass 24 on one end and into a cup-shaped retaining member 32 on the other end. The retaining member 32 is held in the proper position by means of a screw type end cap 34 which may be screwed onto the shaft 26 as indicated. Adjustment of the spring characteristics may be accomplished by means of the end cap 34.

Mounted on the shaft 26 immediately above the stop 28 is a cylindrical resistor 38 in the form of a coil of wire distributed along the axis of the vehicle 14. A wiper 40 which is made of a conductive material, such as steel, is mounted in the mass 24 and in contact with the resistor 38 such that displacement of the mass 24 toward the nose of the vehicle 14 causes the wiper 40 to be displaced axially along the resistor 38. In addition, the interior portion of the vehicle is filled with a damping fluid indicated at 42.

The resistor 38, in combination with the wiper 40, serves to produce a time-displacement voltage waveform which is communicated by means of conductor 18 shown in FIGURE 1 to the ship 16. In order to accomplish this objective, the resistor 38 is connected across a source, not shown, by means of leads 44 and 46. These leads go through a retaining plug 48 mounted in an opening in the tail section 20 of the vehicle 14 to a compartment in the rear of the vehicle 14. This compartment includes a spindle 50 around which is wrapped a three-wire conductor 18 such that during the descent of the vehicle 14 the conductor 18 is paid out in a substantially frictionless fashion. To complete the signal generating means, the conductive mass 24 has connected thereto an additional lead 52 which is connected through the retaining plug 48 to the conductor 18. By this arrangement, displacement of the mass 24 relative to the vehicle 14 caused by deceleration of the vehicle moves the mass-carried wiper 40 along the resistor 38 such that a potential variation is experienced. This variation is conducted through wiper 40, mass 24 and lead 52 to a wire in conductor 18. Thus, relative displacement of the mass 24 and vehicle 14 produces a signal which is conveyed to ship 16 over conductor 18 in the form of a time-varying voltage waveform.

Figure 3:
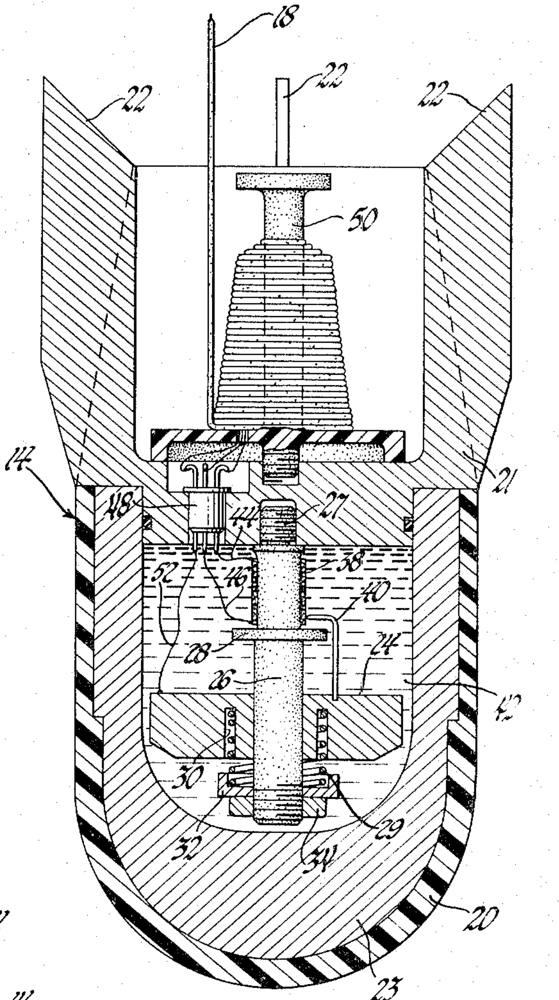
FIGURE 3 is a cross-sectional view corresponding to the device shown in FIGURE 2 but with the interior conditions depicted at a time immediately after contact with the surface to be investigated.

FIGURE 3 shows the vehicle 14 immediately after the point of impact. It will be understood that the vehicle 14 travels through the water 12 at a substantially constant terminal velocity which is reached within the first few feet of descent. This terminal velocity may be, for example, approximately twenty feet per second. The vehicle 14 then continues to descend toward floor 10 until contact is made. At this time, the momentum of the mass 14 causes it to be displaced relative to the vehicle 14 against the action of the spring 29. The displacement of the mass 24 causes the wiper 40 to be displaced along the cylindrical resistor 38. Because of the potential distribution along the resistor 38, the lead 52 has impressed thereon a voltage waveform which corresponds to the time-displacement characteristic of the mass 24. This voltage waveform is communicated to the cable conductor 18 through the lead 52 and may be presented at the ship 16 on an oscilloscope for analysis. Alternatively, a permanent recording may be made of the voltage waveform for future study.

Inasmuch as the vehicle 14 may be manufactured relatively inexpensively, it may not be necessary to retrieve the vehicle after the test has been made. This advantageous situation obviates the need for any sort of strong retrieval cable which would otherwise have to be connected between the vehicle 14 and the ship 16. Since all of the information which is provided by the test has already been communicated to the ship 16, the vehicle 14 may readily be expended without the necessity for taking further time to retrieve the vehicle 14.

It is to be understood that the present invention has been described with reference to a highly specific embodiment thereof and that various modifications and additions will be apparent to those skilled in the art. For a definition of the invention, reference should be had to the appended claims.

What is claimed is:

1. Apparatus for measuring the load bearing characteristics of a substantially horizontal surface comprising a hydrodynamically designed vehicle having a smooth nose, a rearwardly opening tail compartment, and stabilizing fins and adapted for gravitational projection against the surface from a station located above the surface, an accelerometer carried by the vehicle and including a displaceable mass and resilient means tending to resist displacement of the mass from a reference position, means operatively associated with the accelerometer for producing an electrical signal waveform corresponding to the time-displacement characteristic of the mass upon contact of the vehicle with the surface, and a quantity of conductor means for transmitting the signal waveform to the station for analysis thereof, the conductor means being normally baled within the tail compartment to be payed therefrom during descent of the vehicle.

2. Apparatus for measuring the load bearing characteristics of a substantially horizontal surface comprising a hydrodynamically designed vehicle adapted for gravitational projection against the surface from a station located above the surface, a mass carried by the vehicle and mounted for displacement along a vertical axis of the vehicle, resilient means tending to resist displacement of the mass along the vertical axis and adapted to be connected across a source of potential, wiper means mounted on the mass and displaceable therewith along the resistive means to produce a voltage waveform corresponding to the time-displacement characteristic of the mass upon contact with the surface, and conductor means connected to the wiper means for transmitting the voltage waveform to the station for analysis thereof.

3. Apparatus for measuring the load bearing characteristics of the floor of a body of water comprising a hydrodynamically designed vehicle having a relatively low terminal velocity in water, and being adapted for gravitational projection against the floor from a point thereabove, a mass carried by the vehicle and mounted for displacement along a vertical axis, resilient means tending to resist displacement of the mass along said axis, signal generating means operatively associated with the mass for producing an electrical signal waveform corresponding to the time-displacement characteristic of the mass relative to the vehicle upon contact of the vehicle with the floor, conductor means carried by the vehicle and adapted to issue therefrom during descent of the vehicle, the conductor means being connected to the signal generating means for transmitting the signal waveform to said point.

References Cited by the Examiner

UNITED STATES PATENTS

| | | | |
|---|---|---|---|
| 2,477,094 | 7/1949 | Shropshire | 73—84 |
| 2,852,243 | 9/1958 | Shepard | 73—517 |
| 2,944,804 | 7/1960 | Persson et al. | 73—517 X |
| 2,982,122 | 5/1961 | Schatz et al. | 73—12 |
| 3,080,655 | 3/1963 | Ailleret et al. | 73—170 X |
| 3,190,110 | 6/1965 | Craycraft | 73—12 |

RICHARD C. QUEISSER, *Primary Examiner.*

EDWARD D. GILHOOLY, *Assistant Examiner.*